Dec. 22, 1970

HIDEAKI FUKAWA ET AL  3,549,668

PROCESS FOR THE MANUFACTURE OF COENZYMES $Q_9$, $Q_{10}$, $Q_{11}$ AND $Q_{12}$ AND NOVEL COENZYMES $Q_{11}$ AND $Q_{12}$

Filed May 25, 1967

INVENTORS
HIDEAKI FUKAWA, MASASHI TOYODA,
HIDEO FUKUSHIMA & TORU SHIMIZU

BY Mason, Fenwick & Lawrence

ATTORNEYS

United States Patent Office 3,549,668
Patented Dec. 22, 1970

3,549,668
PROCESS FOR THE MANUFACTURE OF CO-
ENZYMES $Q_9$, $Q_{10}$, $Q_{11}$ AND $Q_{12}$ AND NOVEL
COENZYMES $Q_{11}$ AND $Q_{12}$
Hideaki Fukawa, Fukuoka-machi, Masashi Toyoda, Kawa-
goe-shi, Hideo Fukushima, Iruma-gun, Saitama-ken,
and Toru Shimizu, Tokyo, Japan, assignors to Nisshin
Flour Milling Co., Ltd., Tokyo, Japan, a corporation
of Japan
Filed May 25, 1967, Ser. No. 641,283
Claims priority, application Japan, May 26, 1966,
41/33,221; Dec. 9, 1966, 41/80,334
Int. Cl. C07c 49/64
U.S. Cl. 260—396        7 Claims

ABSTRACT OF THE DISCLOSURE

This invention is a process for manufacturing co-
enzymes $Q_9$, $Q_{10}$, $Q_{11}$ and $Q_{12}$ wherein unsaponified con-
tained in raw material containing components of mul-
berry leaves is purified by at least two of molecular
distillation, fractional refrigeration precipitation and ad-
sorption chromatography to obtain isoprenyl alcohols
having 9, 11 and 12 isoprene units and the isoprenyl
alcohol are condensed with 2,3-dimethoxy-5-methyl-1,4-
hydroquinone or 4-acyl derivatives or the isoprenyl alco-
hol having 9 isoprene units is converted into isoprenyl
alcohol having 10 isoprene units and then the isoprenyl
alcohol having 10 isoprene units is condensed with 2,3-
dimethoxy-5-methyl-1,4-hydroquinone or its 4-acyl de-
rivatives.

---

The present invention relates to a process for the
manufacture of coenzymes $Q_9$, $Q_{10}$, $Q_{11}$ and $Q_{12}$ and
novel coenzymes $Q_{11}$ and $Q_{12}$.

The coenzyme Q which has been known is a com-
pound having the following chemical structure:

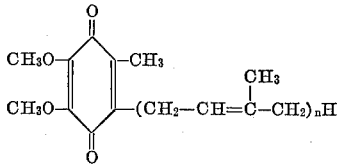

wherein $n$ may be 1 to 10.

The coenzyme Q is an important substance in a living
body related with an electron transmitting action of
mitochondria or an oxidative phosphating reaction and
is useful as a medicine. Specifically coenzymes $Q_9$ and
$Q_{10}$ among its homologues are thought to be present in
higher animals, to perform an important role for the
maintainance of the function of the living body and
to have many effects.

However, their isoprene side chains are so long that
those substances can not be industrially obtained and it
is nearly impossible to chemically synthesize them. There
has been substantially no report that a isoprenyl alcohol
having a regularity of a 1,4-addition which can become
an isoprene side chain or its derivatives having more
than 45 carbon atoms is present even in the nature. The
isoprenyl alcohol which has been confirmed and is avail-
able as a raw material for the industrial synthesis of
coenzyme Q is only solanesol which is isoprenyl alcohol
having 9 isoprene units discovered from tobacco leaves
by R. L. Rowland et al. "J. Am. Chem. Soc." 78, 4680
(1956). As regards an isoprenyl alcohol having 10 iso-
prene units, F. W. Hemming et al. have quantitatively
presumed the presence of one ingredient of a chroma-
tographic fraction extracted from an unsaponified mat-
ter in spadices of an Arum maculatum from only the
result of a paper chromatography but have not de-
termined the structure. ("Proc. Roy. Soc., London" B.
158, 291 (1963)).

Furthermore it has never been practiced to in-
dustrially extract such isoprenyl alcohols. And such iso-
prenyl alcohols in which the isoprene side chain is very
long is so difficult to chemically synthesize that it can
not be industrially obtained today.

We have already discovered an isoprenyl alcohol frac-
tion having 9, 11 and 12 isoprene units by investigating
the composition of an unsaponified matter which has
been industrially produced from silkworm feces, and
we have already succeeded in the isolation and purifi-
cation of them as described in U.S. patent application
Ser. No. 617,654.

The course for isolating and collecting the isoprenyl
alcohol fraction from silkworm feces to determining the
structure is as shown in the following, taking in con-
nection with the accompanying drawing, in which.

First of all, an extract obtained by extracting dry silk-
worm feces with acetone was saponified with methanol-
caustic potash and was then extracted with hexane. The
thus obtained unsaponified matter fraction was used as
a raw material. It was dissolved in hexane or acetone.
The solution was subjected to a proper combination of
any of a fractional refrigeration precipitation (for
example, a deep fractional refrigeration precipitation),
molecular distillation and adsorption chromatography
using silica gel or active alumina. When the solution was
then separated from such impurities as sterol, hydro-
carbon, saturated alcohol, carotenoid and phytol while
confirming the degree of purification by a thin layer
chromatography, a single substance could be obtained.

The thus obtained substance shows a content of 10
to 15% of the unsaponified matter of silkworm feces and
is a pure substance in the thin layer chromatography.

In the thin layer chromatography (silica gel), this sub-
stance retains such $Rf$ values as are shown in Table 1.
It is a light yellow oily liquid at the normal temperature,
shows a refractive index of $n_D 25°:1.5112$ and be-
comes white crystals below —30° C. in acetone, ethanol
or hexane.

Table 1

| Developers: | $Rf$ values |
|---|---|
| Chloroform:methanol (4:1) | 0.84 |
| Isobutanol | 0.61 |
| Chloroform | 0.50 |
| Benzene | 0.48 |
| Chloroform:benzene (1:4) | 0.27 |
| n-hexane | 0.02 |

It is shown in a thin layer chromatography by adsorp-
tion that this substance is one spot and is pure isoprenyl
alcohol group but it is shown in a reversed phase paper
chromatography that this substance can be slightly iso-
lated and contains three isoprenyl alcohols.

That is to say, it contains a comparatively small amount
of solanesol of 9 isoprene units and mostly isoprenyl alco-
hols presumed to be of 11 and 12 isoprene units. These
two isoprenyl alcohols show performances very close to
each other in the reversed phase paper chromatography
and are presumed to be of 11 and 12 isoprene units as
calculated from such mean molecular weight, nuclear magnetic resonance absorption spectrum and element analysis value of the present substance as are described later. The $R_f$ values in the reversed phase paper chromatography of this substance are shown in Table 2.

TABLE 2

| Developers | $R_f$ values | | | |
|---|---|---|---|---|
| | Spot 1 | Spot 2 | Spot 3 | Solanesol from tobacco leaves |
| Acetone | 0.66 | 0.72 | 0.77 | 0.77 |
| Acetic acid | 0.35 | 0.47 | 0.62 | 0.62 |
| 90% n-propanol | 0.44 | 0.55 | | |

NOTE: Fixed phase (Filter paper with the phase reversed with 5% fluid paraffin/n-hexane).

Figure 1:
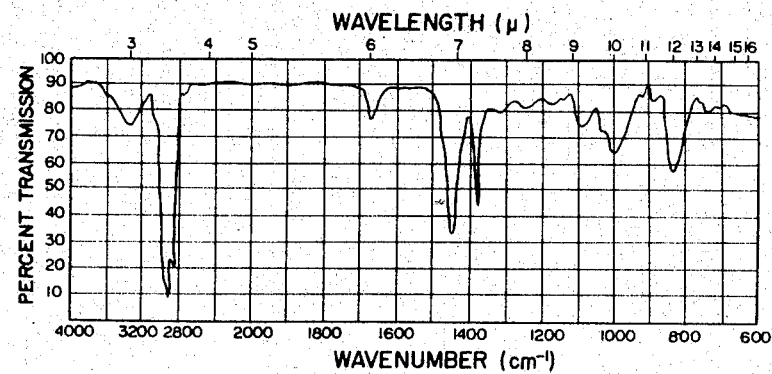
FIG. 1 shows an infrared absorption spectrum of a
substance obtained by the step for the manufacture
of isoprenyl alcohol in the present invention.
Figure 2:
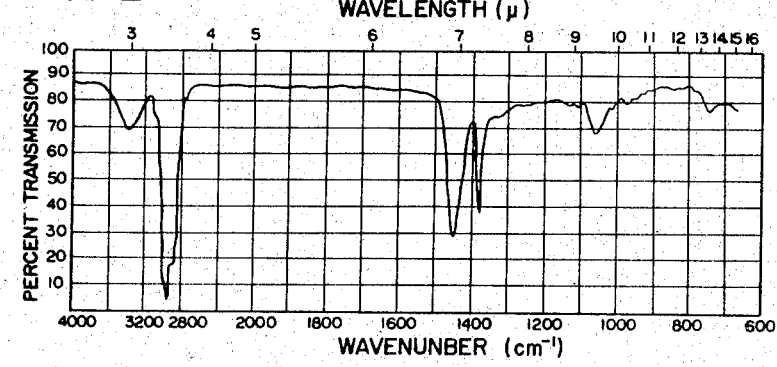
FIG. 2 shows an infrared absorption spectrum in the
case that a substance obtained by the step for the manu-
facture of isoprenyl alcohol in the invention was hydro-
genated.

The boiling point of the above-mentioned one spot in a molecular distillating apparatus is 180° to 240° C. at a vacuum degree of $10^{-3}$ mm. Hg. As shown in FIG. 1, in the infrared absorption spectrum, it has an absorption of a $C=C$ double bond at 1600 cm.$^{-1}$ and has a hydroxyl radical of $-C=C-CH_2OH$ at 1000 cm.$^{-1}$. It is shown that when this substance is hydrogenated the absorption of 1000 cm.$^{-1}$ will shift to 1050 cm.$^{-1}$ and will be of a hydroxyl radical of $-CH_2-CH_2-OH$. This fact coincides with the fact confirmed by Rowland et al. in solanesol, phytol and farnesol (see FIG. 2).

Further, the infrared absorption spectrum denies the presence of any other functional radical and ring. No peculiar absorption is present in the ultraviolet part absorption spectrum and visible part absorption spectrum.

The results of the present analysis are as in Table 3. It is shown that this substance is an isoprenyl alcohol group of 11 isoprene units on the average.

TABLE 3

| | Carbon (percent) | Hydrogen (percent) |
|---|---|---|
| The present substance (analysis values) | 86.00 | 11.80 |
| $C_{55}H_{90}O$ (theoretical values of isoprenyl alcohol of 11 isoprene units) | 86.09 | 11.82 |
| Hydrogenated substance of the present substance (analysis values) | 83.74 | 13.95 |
| $C_{55}H_{112}O$ (theoretical values of the hydrogenated substance of isoprenyl alcohol of 11 isoprene units) | 83.66 | 14.30 |
| Acetylated substance of the present substance (analysis values) | 84.57 | 11.49 |
| $C_{57}H_{92}O_2$ (theoretical values of the acetylated substance of isoprenyl alcohol of 11 isoprene units) | 84.46 | 11.45 |

The mean molecular weight of the present substance is obtained as 773 by a vapour pressure process and is close to the molecular weight of 766 of an isoprenyl alcohol of 11 isoprene units. When the amount of the absorption of hydrogen at the normal temperature was measured with a platinum catalyst, it was found that 1 mol. of hydrogen was absorbed with 70.5 g. of the present substance.

It has become clear that if the molecular weight is 766, 11 double bonds will be present. That is to say, it is shown that each isoprene unit is not saturated. According to a mass spectrum, in this substance, only a signal group of a number of masses which is a multiple of the isoprene units is recognized. It is confirmed by this fact that the isoprene units are regularly bonded by a 1,4—bond.

Figure 3:
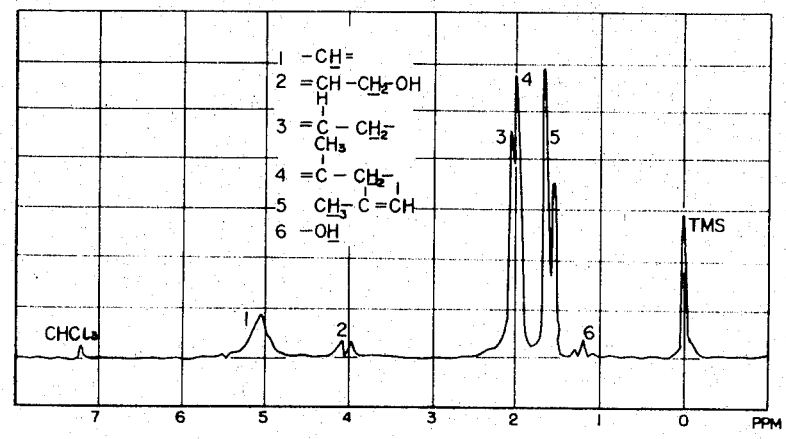
FIG. 3 shows a nuclear magnetic resonance spectrum
of a substance obtained by the step for the manufacture
of isoprenyl alcohol in the present invention.

The nuclear magnetic resonance spectrum (of a proton type of 60 megacycles) of the present substance is shown in FIG. 3. Proton signals of a methyn ($-CH=$), methylene ($-CH_2-$), methyl ($=C-CH_3$), hydroxyl radical (OH) and methylene ($=CH-CH_2-OH$) in the $\alpha$-position of the hydroxyl radical were detected. In a hydrogenated product of this product, that is, a saturated alcohol, the signal of the methyl will vanish and the proton signal of the hydroxyl magnetic field and will separate into three. From these points and the measurement of the signal strength, it is shown that, even from only the nuclear magnetic resonance spectrum, the present substance is a primary isoprentyl alcohol of 11 isoprene units on the average.

By the above, the present substance has been determined to be a mixture of solanesol of 9 isoprene units and two new 1,4-addition-primary isoprenyl alcohols having 11 and 12 isoprene units.

It is an object of the present invention to provide a process for the manufacture of coenzymes $Q_9$, $Q_{10}$, $Q_{11}$ and $Q_{12}$ from isoprenyl alcohols having 9, 11 and 12 isoprene units obtained from a raw material containing components of mulberry leaves.

It is another object of the present invention to provide novel coenzymes $Q_{11}$ and $Q_{12}$.

The present invention is a process for the manufacture of coenzymes $Q_9$, $Q_{10}$, $Q_{11}$ and $Q_{12}$ characterized in that a raw material containing components of mulberry leaves is treated with an organic solvent which is able to extract a fatty matter therefrom, the fatty matter in the extract is saponified with alkali and the unsaponified matter is separated from the saponified matter and is then purified by at least two of such purification methods as a molecular distillation, fractional refrigeration precipitation and adsorption chromatography to obtain isoprenyl alcohols having 9, 11 and 12 isoprene units and the isoprenyl alcohols having 9, 11 and 12 isoprene units thus obtained are condensed with 2,3-dimethoxy-5-methyl-1,4-hydroquinone or its 4-acyl derivatives with use of catalyst and solvent and the obtained condensate is oxidized.

A general manner wherein the manufacture of isoprene alcohols in the process of the present invention is practiced is explained as follows:

First of all, a fatty matter is extracted from silkworm feces or crushed and dried mulberry leaves with such an organic solvent as acetone, chloroform, ether and hexane. The obtained fatty matter is saponified and the unsaponified matter is collected. Usually this step is carried out with caustic potash-methanol. The unsaponified matter is partitioned into a hexane methanol layer and is washed with 90% methanol and the hexane is distilled away in this step.

The thus obtained unsaponified matter is dissolved in hexane or acetone and is fractionally precipitated while being gradually cooled. The sterol and higher saturated alcohol and hydrocarbons are removed. When the solution is then frozen to be less than $-20°$ C., the isoprenyl alcohols having 9, 11 and 12 isoprene units will be precipitated. And then the precipitate is collected. This operation is carried out once or is repeated. Then it is molecular-distilled at a vacuum degree higher than $10^{-3}$ mm. Hg to separate such initial fraction as phytol from the isoprenyl alcohols having 9, 11 and 12 isoprene units. Under the above mentioned conditions, the isoprenyl alcohols having 9, 11 and 12 isoprene units will be distilled away at a temperature of 180° to 240° C. In some cases, the distillate is deeply cooled to be precipitated under the above described conditions and is refined by an adsorption chromatography over silica gel or active alumina. For the developer in such case is desirable a nonpolar solvent.

These steps may be combined in any proper order. Therefore, the molecular distillation may be carried out before the deep-cooled precipitation. In some cases, any one of these steps may be omitted. However, in such case, it will be necessary to increase the number of repetitions of the steps to be carried out.

One preferable combination of these steps is a combination of firstly fractional refrigeration precipitation, secondly molecular distillation and finally fractional refrigeration precipitation.

Another preferable combination of these steps is a combination of firstly molecular distillation and finally fractional refrigeration precipitation.

The fractional refrigeration precipitation may be carried out for example a refrigerator or in a Dry-Ice-acetone mixture. The obtained precipitate is separated for example by a low temperature filtration apparatus.

The molecular distillation may be carried out in a conventional apparatus such as for example, a rotary film centrifugal type molecular distillation apparatus.

As examples of the raw material containing components of mulberry leaves which may be used in the process of the present invention, there is mentioned mulberry leaves themselves and silkworm feces.

As examples of the organic solvent which is able to extract a fatty matter from the raw material and which may be used in the process of the present invention, there is mentioned acetone, chloroform, ether and hexane.

In one preferable isolation of isoprenyl alcohols having 9, 11 and 12 isoprene units the unsaponified matter may be purified by a fractional refrigeration precipitation, a molecular distillation and then fractional refrigeration precipitation and may be further subjected to an adsorption chromatography to isolate isoprenyl alcohols having 9, 11 and 12 isoprene units, respectively.

In another preferable isolation of isoprenyl alcohols having 9, 11 and 12 isoprene units, the unsaponified matter may be purified by a molecular distillation and then fractional refrigeration precipitation and may be further subjected to an adsorption chromatography to isolate isoprenyl alcohols having 9, 11 and 12 isoprene units, respectively.

Furthermore, the isoprenyl alcohol having 9 isoprene units can be isolated by dissolving the isoprenyl alcohol mixture in acetone, cooling the obtained solution 0° to −10° C. and crystallizing isoprenyl alcohol having 9 isoprene units only, or alternatively by molecular-distilling the unsaponified matter, dissolving the distillate in benzene, adding the solution with a solution of thiourea in methanol to form an adduct compound of thiourea-isoprenyl alcohol having 9 isoprene units and then decomposing the adduct compound formed with water.

Therefore, the isoprenyl alcohol having 9 isoprene units is preferably isolated by processes wherein the unsaponified matter is purified by a fractional refrigeration precipitation, molecular distillation and then fractional refrigeration precipitation and is further dissolved into acetone and the solution is cooled to a temperature of 0° to −10° C., or wherein the unsaponified matter is purified by a molecular distillation and then fractional refrigeration precipitation and is further dissolved into acetone and the solution is cooled to a temperature of 0° to −10° C., or wherein the unsaponified matter is purified by a molecular distillation and then is treated with thiourea to obtain an adduct compound of thiourea-isoprenyl alcohol having 9 isoprene units and the compound is subjected to an adsorption chromatography to isolate isoprenyl alcohol having 9 isoprene units.

Furthermore, isoprenyl alcohol having 11 isoprene units is preferably isolated by a process wherein the purified mixture of isoprenyl alcohols having 9, 11 and 12 isoprene units is subjected to an adsorption chromatography by using a silica gel and a suitable developer such as for example 10% (v./v.) ethyl ether containing n-hexane.

And isoprenyl alcohol having 12 isoprene units is preferably isolated by a process wherein the purified mixture of isoprenyl alcohols having 9, 11 and 12 isoprene units is subjected to an adsorption chromatography by using a silica gel and a suitable developer such as for example 5% (v./v.) ethyl ether containing n-hexane.

The identification of isoprenyl alcohol having 9 isoprene units is carried out as follows:

The purified mixture of isoprenyl alcohols having 9, 11 and 12 isoprene units which was obtained as before-mentioned is respectively separated by an adsorption chromatography using a silica gel. A fraction which has been finally eluted is solidified at a normal temperature. The solid is recrystallized from acetone to obtain white crystals, M.P. 38° to 40° C. When white crystals are mixed and melted together with solanesol having 9 isoprene units which was obtained from tobacco leaves by Rowland et al. process, the melting point of white crystals does not decrease and the chromatographic characters and various spectrums of white crystals are quite identifical with that of solanesol.

The identification of isoprenyl alcohol having 11 isoprene unit is carried out as follows:

The purified mixture of isoprenyl alcohols having 9, 11 and 12 isoprene units is subjected to an adsorption chromatography using a silica gel and a developer for example 10% (v./v.) ethyl ether containing n-hexane. Thus a colorless oily matter is obtained which shows $Rf$ value $=0.43$ in a reversed phase paper chromatography using N,N'-dimethyl formamide as a solvent and which has a melting point of 9° to 10° C. and refraction index $n_D^{25°}=1.5094$.

The molecular weight of the oily matter is as follows:
Found: Test (1), 772; Test (2), 756. Calculated: Test (1), 7673; Test (2), 767.3.

Elementary analysis of the oily matter is as follows:
Found (percent): C, 86.11; H, 11.93. Calculated as $C_{55}H_{90}O$ (percent): C, 86.09; H, 11.82.

When the oily matter is hydrogenated, it is recognized that 11.0 double bonds are present in the molecular if the molecular weight of the oily matter is 767.3.

Infrared spectrum and nuclear magnetic resonance adsorption spectrum of the oily matter are quite identical with those of the mixture of isoprenyl alcohols. From the above fact, we confirm that the oily matter is undecaisoprenol, namely isoprenyl alcohol having 11 isoprene units.

The identification of isoprenyl alcohol having 12 isoprene units is carried out as follows:

The purified mixture of isoprenyl alcohols having 9, 11 and 12 isoprene units is subjected to adsorption chromatography using a silica gel and a developer for example 5% (v./v.) ethyl ether containing n-hexane. Thus a colorless oily matter is obtained which shows $Rf$ value$=0.34$ in a reverse phase paper chromatography using N,N'-dimethyl formamide as a solvent and which has a melting point of 15° to 16° C. and a refraction index $n_D^{25°}=1.5095$.

The molecular weight of the oily matter is as follows:
Found: Test (1), 837; Test (2), 829. Calculated: Test (1), 835.4; Test (2), 835.4.

Elementary analysis of the oily matter is as follows:
Found (percent): C, 86.19; H, 12.00. Calculated as $C_{60}H_{98}O$ (percent): C, 86.26; H, 11.82.

When the only matter is hydrogenated, it is recognized that 12.17 double bonds are present in the molecular if it is assumed that the molecular weight of the oily matter is 835.4.

Infrared spectrum and nuclear magnetic resonance adsorption spectrum of the oily matter are quite identical with those of the mixture of isoprenyl alcohols. From the above fact, we confirm that the oily matter is undecaprenol, namely isoprenyl alcohol having 12 isoprene units.

The solanesol obtained by the above mentioned method was condensed with 2,3-dimethoxy-5-methyl 1,4-benzohydroquinone by using zinc chloride and glacial acetic acid as catalysts without any solvent according to such known method as, for example, the method of Eisler et al. (Helv. Chim. Acta. 42, 2616, 1959), was oxidated with silver oxide or the like without separating the obtained 2,3-dimethoxy-5-methyl-6 - nonaprenyl - benzohydroquinone, was refined by a chromatography or the like and could be led to 2,3-dimethoxy-5-methyl-6-nonaprenyl-benzoquinone or a coenzyme Q.

Further, a tertiary alcohol or primary alcohol (isodecaprenol or decaprenol) of 50 carbon atoms was synthesized by increasing the number of carbon atoms of 5 by a known method in order to make the thus obtained solanesol a side chain row material for a coenzyme $Q_{10}$. That is to say, the solanesol was made solanesyl bromide by a known method and was then made a ketone of 48 carbon atoms by the steps of an acetoacetate condensation, saponification and also decarboxylation and isodecaprenol of 50 carbon atoms was synthesized by its acetylene addition reaction and the partial reduction of the triple bond. The isodecaprenol was then bromidized to be decaprenyl bromide and was boiled together with sodium acetate, potassium or lead nitrate so as to be hydroxidized. Thus decaprenol which is a primary isoprenyl alcohol was synthesized.

As judged from its infrared absorption spectrum, nuclear magnetic resonance absorption spectrum and thin layer chromatograph, the thus obtained isodecaprenol or decaprenol was so high in the purity as to be able to be readily used as a raw material for synthesizing a coenzyme $Q_{10}$. In exactly the same manner as in the case of synthesizing the coenzyme $Q_9$, when it was condensed with 2,3-dimethoxy-5 - methyl-1,4-benzohydroquinone by using zinc chloride and glacial acetic acid as catalysts, for example, according to the method of Eisler and was then oxidized and refined, it could be led to 2,3-dimethoxy-5-methyl-6-decaprenyl-1,4-benzoquinone or a coenzyme $Q_{10}$. For both, the condensing catalyst to be used may be aluminum chloride, zinc chloride or a trifluoroboron ether complex and the solvent may be diethyl ether or dioxane or no solvent may be used. In the oxidating step, such catalytic oxidation as with maganese dioxide, lead peroxide, silver oxide, nickel peroxide or air can be utilized for the oxidating means. The refinement is carried out mostly by a chromatography over silica gel.

The infrared absorption spectrum, nuclear magnetic resonance absorption spectrum and ultraviolet absorption spectrum of each of the coenzymes $Q_9$ and $Q_{10}$ obtained by the present invention exactly coincided with those of a product obtained from a natural matter by extraction. Their melting points were respectively 42 to 44° C. and 47 to 49° C. The E value (at 271 m$\mu$ with an n-hexane solution) of the ultraviolet part absorption spectrum of each of them showed more than 95% of the standard product. Their single layer chromatography and reversed phase chromatography showed single spots.

Furthermore, a mixture of 2,3-dimethoxy-5-methyl-6-undecaprenyl-1,4 - benzoquinone and 2,3 - dimethoxy-5-methyl - 6 - dodecaprenyl - 1,4 - benzoquinone which are novel coenzyme Q homologues is obtained by further refining the isoprenyl alcohol group so as to be a mixture of only alcohols of 11 and 12 isoprene units (undecaprenol and dodecaprenyl) occupying the greater part of it, condensing it with 2,3-dimethoxy-5-methyl-1,4-hydroquinone and then oxidating the condensate. This product has a physiological activity of a coenzyme Q. As a result of the recovery test of the breathing activity of the mitochondria of the liver of a rat from which a coenzyme Q had been removed, this product has been recognized to have a physiological activity substantially equal to that of a coenzyme Q homologue extracted from a natural matter.

Temperature of the reaction can vary from about −10° C. to 100° C. depending on the kind of the catalyst. Further, the isoprenyl alcohol may be mixed from the first instead of being dropped. In order to prevent the oxidation of the raw material hydroquinone and the condensate, it is preferable to carry out the reaction in such inert gas current as, for example, of nitrogen gas.

The reaction product has the condensing agent removed by washing with an ether-water system or by filtration and further has the unreacting 2,3-dimethoxy-5-methyl-1,4-hydroquinone removed by washing with a solution of 2 to 5% alkali substance. In some cases in order to remove the unreacting isoprenyl alcohol and the secondary reaction product, it is possible to wash the reaction product with an alcoholic alkali solution of a high concentration. When the solvent is removed, a residue containing 2,3 - dimethoxy-5-methyl-6-prenylhydroquinone will be obtained. However, as it has not been separated, its physical constants have not been obtained.

Since residue is dissolved in ether or the like, its contact-oxidated with a proper oxidating agent or catalyst into a corresponding quinone and is refined by a chromatography over silica gel or alumina. In some cases, it is refined by recrystallization from a solvent.

In case a isoprenyl alcohol group is used as it is, it will be possible to isolate a coenzyme Q group by a chromatographic separation or crystallization in a refining step after the condensation and oxidation.

Further, in working the present invention, even a 4-acyl derivatives of 2,3-dimethoxy-5-methyl-1,4-hydroquinone will give a higher reaction result and therefore may well be used.

The present invention is illustrated by the following examples.

EXAMPLE 1

140 g. of fatty matter obtained by acetone-extraction from 3.3 kg. of dry silkworm feces was saponified with caustic potash-methanol while a heating was effected at the temperature of 60° C. with an agitation for 2 hours. The whole matter was added with hexane and the hexane phase was well washed with 90% methanol and then water to obtain 100 g. of an unsaponified matter having a reddish brown color. 100 g. of the unsaponified matter were dissolved in n-hexane and the solution was cooled down to 0° C. The precipitated crystals were separated by filtration. The filtrate was distilled to remove n-hexane therefrom. When the obtained residue was dissolved in acetone in a volume 5 times as large and the solution was deep cooled to −40° C., crystals were separated by filtration and the operation was repeated 2 to 3 times to obtain 15 g. of a light yellow oily matter (at the room temperature).

In this oily matter, isoprenyl alcohols and ome of sterol were included. This oily matter was molecular-distilled under a vacuum of less than −$10^{-3}$ mm. Hg to collect a fraction of 180 to 240° C. As a result 10 g. of a light yellow oily matter ($n_D^{25°}$ 1.5110) were obtained.

It was shown that the light yellow oily matter was a single spot in a thin layer chromatography and that it was a mixture of isoprenyl alcohols in an infrared adsorption spectrum and also nuclear magnetic resonance adsorption spectrum.

It was found from the result of a summary analysis of the oily matter by a reversed phase paper chromatography that the oily matter was consisted of about 45% each of isoprenyl alcohols having 11 and 12 isoprene units and about 10% of isoprenyl alcohol having 9 isoprene units.

10 g. of the isoprenyl alcohol mixture were subjected to an adsorption chromatography using 100 g. of silica gel. Using ethylether containing n-hexane as a developer, the mixture was treated with firstly 5% (v./v.) ethyl ether containing n-hexane to isolate the fraction (A) and with secondly 10% (v./v.) ethyl ether containing n-hexane to isolate the fraction (B) and with thirdly 15% (v./v.) ethyl ether containing n-hexane to isolate the fraction (C). Each of the isolated fractions (A), (B) and (C) was treated to remove the solvent and thus 4 g., 4 g. and 0.8 g. of respective fractions were obtained.

In order to completely purify each fraction it is necessary to repeat the absorption chromatography, but it can be carried out one time when the operation is carried out very carefully.

It was confirmed by the identification method beforementioned, that the fraction (A) is isoprenyl alcohol having 11 isoprene units and that the fraction (B) is isoprenyl alcohol having 12 isoprene units and that the fraction (C) is isoprenyl alcohol having 9 isoprene units (that is solanesol).

Then, the isoprenyl alcohol mixture was dissolved in a solution of 98% hydrous acetone. When the solution was cooled to 0° to −10° C., solanesol was deposited as crystals. The crystals were removed by filtration. The filtrate was concentrated to obtain a mixture of mostly undecaprenol and dodecaprenol of 11 and 12 isoprene units. 10 g. of 2,3-dimethoxy-5-methyl-1,4-hydroquinone were dissolved in 50 ml. of dioxane. 7 g. of zinc chloride and 1.5 g. of pyrophosphoric acid were added to the solution. 10 g. of the above-mentioned refined isoprenyl alcohol mixture dissolved in some dioxane was dropped into the solution at the room temperature. Then the solution was made to react at 50° C. for 5 hours while being stirred. After the reaction, the system was ether-extracted and was washed with water and an aqueous solution of 3% caustic potash so as to be neutralized. Then the solvent layer was dried and distilled away. The obtained brown oily matter was shaken together with 10 g. of silver oxide. Then, the silver oxide was separated by filtration and the filtrate was concentrated.

In such case, 15 g. of a crude oily matter were obtained. This oily matter was dissolved in n-hexane, was chromatographically treated using 300 g. of aluminium oxide (of Blockman activity II) and was eluted with a solvent system of n-hexane/ethyl ether and then the elute was concentrated, was dissolved in hexane and was refined by a chromatography over 100 g. of silica gel.

The yield was 6 g. of a light yellow oily matter. This matter gave a single spot in a thin layer chromatography (of silica gel/benzene:chloroform of 4:1) but the binary in a reversed phase paper chromatography (of paraffin impregnated filter paper/dimethyl formamide). That is to say, it was a mixture of 2,3-dimethoxy-5-methyl-6-undecaprenyl benzoquinone and 2,3-dimethoxy-5-methyl-6-dodecaprenyl benzoquinone. This was confirmed from the infrared absorption spectrum, nuclear magnetic resonance absorption spectrum and ultraviolet absorption spectrum. At the absorption maximum of 270 m$\mu$ in n-hexane, the E value was 155 and the refractive index was $(n_D^{25°}) = 1.5258$.

As to the recovery of the physiological activity of the mito-chondria of liver of a rat from which the coenzyme Q had been removed, the present product was as effective as coenzymes $Q_6$, $Q_9$ and $Q_{10}$.

EXAMPLE 2

The isoprenyl alcohol mixture obtained from silkworm feces in the same manner as in Example 1 was dissolved in a solution of 98% hydrous acetone. The solution was cooled to 0° to −10° C. Soranesol was deposited as crystals. The deposited crystals were separated by filtration, were washed with a small amount of cooled acetone and were dried. The thus obtained white crystals of solanesol (that is nonaprenol) had a melting point of 38° to 40° C. The infrared spectrum and nuclear magnetic resonance spectrum of this product coincided with the values in the data.

19 g. of solanesol, 9 g. of 2,3-dimethoxy-5-methyl-1,4-benzohydroquinone, 6 g. of zinc chloride and 0.5 ml. of glacial acetic acid were added to 200 ml. of anhydrous ether. The solution was stirred with a nitrogen gas current at the room temperature for 10 minutes. Then the ether was removed under a reduced pressure. The solution was left as it was at 55° C. for 20 minutes and was ether-extracted by pouring ice water. The unreacting hydroquinone was removed with a solution of 5% caustic potash. The system was washed with water and was dried. The drying agent was removed by decantation. The system was oxidated by adding 15 g. of silver oxide. The solvent was removed. The system was chromatographed over silica gel. In the same manner as in Example 1, an orange yellow fraction was separated and crystallized to obtain 6 g. of a coenzyme $Q_{10}$. This product showed exactly the same diagrams of the infrared absorption spectrum and nuclear magnetic resonance absorption spectrum as of a coenzyme $Q_{10}$ extracted from a natural matter.

E value (at 271 m$\mu$ in an n-hexane solution): 175 to 180.

Thin layer chromatography (silica gel:benzene:chloroform of 1:4:1) Rf: 0.31.

Reversed phase chromatography (5% paraffin filter paper: 90% n-propanol) Rf: 0.27.

EXAMPLE 3

50 g. of solanesol obtained as described in Example 1, 90 ml. of n-hexane, 90 ml. of ethyl ether and 3 ml. of pyridine were mixed with 50 g. of solanesol obtained by repeating the above mentioned operation. 6 ml. of phosphorus tribromide were dissolved in 30 ml. of n-hexane. This solution was dropped below 10° C. over 30 minutes into the above solution. The solution was further stirred at the same temperature for 2 hours. After the reaction, the solution was put into water and was ether-extracted and dried and the solvent was removed to obtain 52 g. of solanesol bromide.

52 g. of solanesol bromide, 13 g. of ethyl acetoacetate and 100 ml. of dioxane were mixed together. An ethanol solution of sodium ethylate prepared from 2.5 g. of sodium was dropped at 0° C. into the above mixed solution while it was being stirred. They were made to react at the room temperature for 20 hours while being stirred. After the reaction, the temperature was gradually elevated to 80° C. 130 ml. of a solution of 10% caustic soda were dropped into the solution. The solution was further stirred at the same temperature for 4 hours to carry out a saponification and also decarboxylation. The reaction solution was put into water and was ether-extracted, washed and dried and then the solvent was removed to obtain 45 g. of a ketone of 48 carbon atoms.

45 g. of the above mentioned ketone were dissolved in 150 ml. of anhydrous ether. The solution was dropped into a solution of sodium acetylide prepared from 3.5 g. of sodium and acetylene in 500 ml. of liquid ammonia. The ammonia was removed by stirring under an added pressure at 20° C. for 20 hours. The solution was mixed with ammonium chloride, was put into water and was ether-extracted, washed and dried and then the solvent was removed to obtain 40 g. of ethynyl carbinol of 50 carbon atoms. This product was dissolved in 200 ml. of petroleum ether. 2 g. of Lindlar's catalyst and a slight amount of quinoline were added to the solution. The solution was made to absorb hydrogen under the normal pressure. When the absorption of 1250 ml. of hydrogen ended, the catalyst was separated by filtration and the solvent was removed to obtain 40 g. of isodecaprenol.

40 g. of isodecaprenol and 18 g. of 2,3-dimethoxy-5-methyl-1,4-benzohydroquinone were dissolved in 200 ml. of anhydrous ether. 24 g. of anhydrous zinc chloride and 1.8 ml. of glacial acetic acid were added and mixed with the solution in a nitrogen gas current. The ether was removed under a reduced pressure at 55° C. The solution was then left at the same temperature for 25 minutes, was ether-extracted as it was, was washed with water, a solution of 5% caustic potash and then water and was dried. The ether layer then decanted. 50 g. of silver oxide and 50 g. of anhydrous sodium sulfate were added to the solution. The solution was left to be oxidated overnight while being stirred from time to time. It was chromatographed with a column filled with 350 g. of silica gel. A clear reddish orange fraction eluted with hexane containing 5% ether was collected. The solvent was removed. The solution was then left to crystallize to obtain 12 g. of a coenzyme $Q_{10}$. Then it was dissolved in a small amount of acetone. The solution was cooled to −10° C. The crystallized crystals were separated by filtration and were dried to obtain 11 g. of orange crystals. This product showed exactly the same diagrams of the infrared absorption spectrum and nuclear magnetic resonance spectrum as of a natural coenzyme $Q_{10}$ extracted from the heart of a cow.

E value (at 271 m$\mu$ in an n-hexane solution): 165 to 170.

Thin layer chromatography (silica gel:benzene:chloroform of 1:4:1) Rf: 0.33 to 0.35.

Reversed phase chromatography (5% paraffin filter paper: 90% n-propanol) Rf: 0.19.

EXAMPLE 4

The same process as in Example 3 was carried out until isodecaprenol was produced. 20 g. of isodecaprenol were dissolved in 200 ml. of anhydrous ether. A solution prepared by dissolving 5 ml. of phosphorus tribromide in 20 ml. of anhydrous ether was dropped at 20° C. within 1 hour into the above solution. The solution was further stirred at the same temperature for 4 hours. The reaction solution was put into ice water, was washed with water, a solution of 5% sodium bicarbonate and then water and was dried. The solvent was removed to obtain 21 g. of decaprenyl bromide.

This product together with 100 ml. of anhydrous acetone and 20 g. of anhydrous potassium acetate was heated and refluxed for 20 hours. The solvent was removed under a reduced pressure. The residue was saponified with a solution of 5% ethanolic caustic soda and was extracted and washed by a normal process and the solvent was removed to obtain 20 g. of crude decaprenol as a mixture with a by-produced hydrocarbon. By a chromatography over silica gel, 16 g. of decaprenol were obtained.

16 g. of decaprenol and 7 g. of 2,3-dimethyl-5-methyl-1,4-benzohydroquinone were dissolved in 100 ml. of anhydrous ether. A solution prepared by dissolving 5 g. of aluminum chloride and 0.5 ml. of a boron trifluoride ether complex in 50 ml. of anhydrous ether was dropped into the above solution in a nitrogen gas current at 0° C. over 30 minutes. The solution was further made to react to be condensed at the same temperature for 4 hours. Ether was added to the system. The system was washed with water, a solution of 5% caustic potash and then water and was dried. The ether layer was collected by decantation. 20 g. of active manganese dioxide and 10 g. of anhydrous sulfuric acid were added to the system. The system was stirred and oxidated at 40° C. for 3 hours. The oxidating agent was separated by filtration. The system was concentrated and was chromatographed over silica gel and crystallized as in Example 3 to obtain 4.5 g. of a coenzyme $Q_{10}$. The quality of this product was the same as of the coenzyme $Q_{10}$ obtained in Example 3.

EXAMPLE 5

140 g. of a dark green oily matter obtained by acetone-extracting 4 kg. of dry mulberry leaves were saponified with caustic potash-methanol while being heated and stirred. Hexane was added to hte system. The hexane layer was washed with a solution of 90% methanol. The hexane was concentrated to obtain 70 g. of a reddish brown unsaponifiable matter. This matter was dissolved in 1 liter of acetone. The solution was cooled to 0° C. and the deposited crystals (mostly of sterol) were separated by filtration. Then the solution was cooled to be below −40° C. and the deposited crystals were separated by filtration and were washed with some cold acetone to obtain 20 g. of a light yellow oily matter. This matter was dissolved in 50 ml. of benzene. 200 ml. of a methanol solution of 10% (w./v.) thiourea were dropped into the above solution at 20° C. Further, 20 ml. of benzene were added to the solution. The solution was left standing overnight. The deposited crystals were separated by filtration, were washed with a small amount of benzene, were then decomposed with water, were ether-extracted and were washed with water. When the ether was then recovered under a reduced pressure. 1.5 g. of solanesol of a purity of about 50% were obtained.

When this product was refined by a column chromatography over 20 g. of silica gel, 0.8 g. of solanesol was obtained. The subsequent process was carried out as in Examples 1, 2 and 3.

EXAMPLE 6

15 g. of isoprenyl alcohol fraction which was obtained as in Example 1 and which contains about equal amount of undecaprenol and and dodecaprenol, 5 g. of 2,3-dimethoxy-5-toluhydroquinone, 4 g. of zinc chloride and 0.3 g. of gracial acetic acid were dissolved into 200 ml. of anhydrous and the ether was removed under a reduced pressure from the solution and the residue was maintained at the temperature of 50° C. with a heating for 30 minutes to carry out a reaction. After the completion of the reaction, the reaction matter was immediately cooled and then was dissolved into ether and was washed with water, 5% sodium hydroxide solution (containing 1% hydrosulfite) and water and was dried. The dried reaction product was oxidated by adding 10 g. of silver oxide and 10 g. of anhydrous sodium sulfate thereto and then stirring the mixture at the room temperature for 2 hours. After the reaction, the oxidated matter was added with small amount of active carbon and was filtrated and the solvent was removed under a reduced pressure. The concentrate was dissolved into n-hexane and then was treated by a column absorption chromatography using 120 g. of silica gel. The obtained reddish-brown band fraction was eluted with 2 to 3% (v./v.) ether containing n-hexane to obtain 3 g. of mixture of coenzymes $Q_{11}$ and $Q_{12}$. The various properties of the mixture are as follows:

| | $R_f$ value |
|---|---|
| Thin layer chromatography (silica gel). | 0.25–0.27 (chloroform: benzene=1:4). |
| Do. | 0.33–0.34 (chloroform). |
| Reversed phase paper chromatography (5% n-paraffin impregnated filter paper). | 0.30, 0.40 (dimethylfarmamide). |
| Do. | 0.29, 0.36 (90% n-propanol). |
| Do. | 0.29, 0.39 (acetic acid). |
| Refractive index. | $n_D^{25°}=1.5258$. |
| Ultraviolet absorption spectrum (n-hexane solution): | |
| Maximum 273 mµ | $(E_1^{1\%} cm.:154)$. |
| Minutes 236 mµ | |

Infrared absorption spectrum and nuclear magnetic resonance absorption spectrum of coenzyme $Q_{11}$ was identical to that of coenzyme $Q_{12}$.

This product showed a physiological activity substantially equal to that of natural coenzymes $Q_6$ and $Q_{10}$, for the recovery of the breathing activity of the mitochondria of the liver of a rat from which coenzyme Q had been removed.

EXAMPLE 7

1.2 g. of undecaprenol which was prepared from silkworm feces as in Example 1, 1.2 g. of 2,3-dimethoxy-5-toluhydroquinone, 1 g. of zinc chloride and 0.1 ml. of glacial acetic acid were dissolved into 100 ml. of anhydrous ether and the solvent was removed under a reduced pressure from the solution and a reaction was effected at the temperature of 55° C. with a heating for 30 minutes. The reaction product was washed with water, 5% caustic potash solution (containing 1% of hydrosulfite) and then water, and further was dried. The dried reaction product was added with 3 g. of silver oxide and 3 g. of anhydrous sodium sulfate and then was oxidated at the room temperature for one hour with a stirring. After a filtration and concentration of the oxidation product, it is treated chromatographically by the use of 45 g. of silica gel and a fraction which was eluted in 2 to 3% (v./v.) ether containing n-hexane was collected. And the fraction was treated by a column chromatography to obtain 3 g. of a reddish-brown oily coenzyme $Q_{11}$. The various properties of the product are as follows:

| | $R_f$ value |
|---|---|
| Thin layer chromatography (silica gel). | 0.25 (chloroform:benzene=1:4). |
| Do. | 0.34 (chloroform). |
| Reversed-phase paper chromatography (5% n-paraffin impregnated filter paper). | 0.41 (dimethylforamide). |
| Do. | 0.36 (90% n-propanol). |
| Do. | 0.39 (acetic acid). |
| Refractive index. | $n_D^{25°}=1.5281$. |

*Elementary analysis.*—Found (percent): C, 82.24; H, 10.49. Calculated as $C_{64}H_{98}O_4$ (percent): C, 82.52; H, 10.60.

Ultraviolet absorption spectrum (n-hexane solution)

Max. 273 m$\mu$, min. 236 m$\mu$ ($E_{1cm.}^{1\%}=156$)

of the product are as follows:

Infrared absorption spectrum, main absorption
2830, 1643, 1605, 1450, 1380, 1290, 1265, 1200, 1150, 1100, 1020 (m.), 950 (cm.$^{-1}$)

Nuclear magnetic resonance absorption spectrum
$\tau$ value (CDCl$_3$ solution, TMS standard)
8.30, 8.23, 7.90, 6.73 (d.), 5.95, 4.80 (m.)
CH/CH$_3$ proton area ratio 1.80 (theoretical value 1.85)

EXAMPLE 8

1.2 g. of dodecaprenol which was prepared from silkworm feces as in Example 1, 1.2 g. of 2,3-methoxy-5-toluhydroquinone, 1 g. of zinc chloride and 0.1 ml. of glacial acetic acid were dissolved into 100 ml. of anhydrous ether and the solvent was removed under a reduced pressure from the solution and a reaction was effected at the temperature of 55° C. with a heating for 3 minutes. The reaction product was washed with water, 5% caustic potash solution (containing 1% of hydrosulfite) and then water, and further was dried. The dried reaction product was added with 3 g. of silver oxide and 3 g. of anhydrous sodium sulfate and then was oxidated at the room temperature for one hour with a stirring. After a filtration and concentration of the oxidation product, it is treated chromotographically by the use of 45 g. of silica gel and a fraction which was eluted in 2 to 3% (v./v.) ether containing n-hexane was collected. And the fraction was treated by a column chromotography to obtain 3 g. of a reddish-brown oily coenzyme $Q_{12}$. The various properties of the product are as follows:

| | Rf value |
|---|---|
| Thin layer chromatography (silica gel). | 0.27 (chloroform:benzene=1:4). |
| Do. | 0.33 (chloroform). |
| Reverse filter paper chromatography (5% n-paraffin impregnated filter paper). | 0.30 (dimethylformamide). |
| Do. | 0.29 (90% n-propanol). |
| Do. | 0.29 (acetic acid). |
| Refractive index. | $n_D^{25°}=1.5228$. |

*Elementary analysis.*—Found (percent): C, 10.41; H, 82.84. Calculated as $C_{69}H_{106}O_4$ (percent): C, 10.69; H, 82.91.

Ultraviolet absorption spectrum (n-hexane solution)

Max. 273m$\mu$, Min. 236m$\mu$($E_{1cm.}^{1\%}=144$)

Infrared absorption spectrum
2830, 1643, 1605, 1450, 1380, 1290, 1265, 1200, 1150, 1100, 1020 (m.), 950 (cm.$^{-1}$)

Nuclear magnetic resonance absorption spectrum
$\tau$ value (CDCl$_3$ solution, TMS standard)
8.30, 8.23, 7.90, 6.73 (d.), 5.95, 4.80 (m.)
CH=/CH$_3$O—proton area ratio 1.95 (theoretical value 2.00)

When following Examples 9 to 12 show the various embodiments in which isoprenyl alcohol may be obtained. In these examples, isoprenyl alcohols may be converted into coenzyme Q, respectively as described in the above-mentioned examples.

EXAMPLE 9

100 g. of the unsaponified matter which were obtained from the silkworm fees as described in Example 1 were molecular-distilled under a vacuum of 10$^{-3}$ mm. Hg to separate a fraction of 180° to 240° C. from phytol and sterol which were disitlled at a temperature of less than 180° C. 30 g. of the obtained fraction which were distilled at a temperature of 180° to 240° C. were dissolved in acetone and the solution was cooled to −35° C. to deposit crystals. 25 g. of crystals which are in a state of an orange oily matter at the normal temperature were obtained by a filtration.

The orange oily matter was a mixture of almost pure isoprenyl alcohols. 8 g. of isoprenyl alcohol having 12 isoprene units, 6 g. of isoprenyl alcohol having 11 isoprene units and 1.5 g. of isoprenyl alcohol having 9 isoprene units were obtained by subjecting the above mixture to an adsorption chromatography as described in Example 1.

EXAMPLE 10

10 g. of the isoprenyl alcohol mixture which were obtained in Example 1 were dissolved in acetone in a volume 5 times as large and the solution was cooled to a temperature of 0° to −10° C. to precipitate a crude isoprenyl alcohol having 9 isoprene units. The precipitated crude isoprenyl alcohol having 9 isoprene units was further recrystallized from same solvent as the above to obtain 0.8 g. of isoprenyl alcohol having 9 isoprene units. M.P. about 38° C. When the product was mixed with isoprenyl alcohol which was obtained from tobacco leaves a single spot was obtained even if a reversed phase paper chromatography was carried out.

EXAMPLE 11

10 g. of the isoprenyl alcohol mixture which were obtained in Example 9 were treated with acetone as described in Example 10 to obtain 1 g. of isoprenyl alcohol having 9 isoprene units. M.P. 38° C. It was recognized from an infrared adsorption spectrum and nuclear magnetic resonance adsorption spectrum that the product corresponded to the standard isoprenyl alcohol having 9 isoprene units.

EXAMPLE 12

500 g. of the unsaponified matter which were obtained from the silkworm feces as described in Example 1 were molecular-distilled under a vacuum of 10$^{-3}$ mm. Hg to collect a fraction of 180° to 240° C. The fraction was dissolved in 200 ml. of benzene and the solution was poured with 100 ml. of 10% (w./v.) thiourea-methanol solution at the temperature of 20° C. and furthermore was added with benzene until a homogeneous system was obtained. The obtained homogeneous system was left to stand overnight in a refrigerator, and the precipitated crystals were well washed with a cold benzene, and then were decomposed with water and extracted with ether. The extract was washed with water and the solvent was recovered from the extract to obtain 8 g. of a crude isoprenyl alcohol having 9 isoprene units.

When the crude isoprenyl alcohol was subjected to an adsorption chromatography by 50 g. of silica gel and was treated with 10% (v./v.) ether containing n-hexane to isolate 5 g. of pure isoprenyl alcohol having 9 isoprene units.

The pure product was recrystallized from acetone to give crystals having a melting point of 40° C. The product showed a single spot in a thin layer chromatography and also a reversed phase paper chromatography. The infrared adsorption spectrum and nuclear magnetic resonance adsorption spectrum of the product coincided with those described in the literatures before-mentioned.

EXAMPLE 13

600 g. of the unsaponified matter which were obtained from the silkworm feces as described in Example 1 were dissolved in 600 g. of n-hexane and the precipitated crystals were separated from the solution. The filtrate was washed with 10% methanol several times. The n-hexane layer was concentrated and the concentrate was dissolved in acetone and the solution was cooled to 0° C. As a result crystals (consisted of mainly sterol and saturated alcohol) were precipitated and the crystals were filtrated from the solution. The filtrate was then cooled to $-40°$ C. and the precipitated crystals were separated by a filtration and then washed with a cold acetone and furthermore was recrystallized under the same conditions as the above. 180 g. of a light yellow oily matter were thus obtained.

The oily matter was subjected to a molecular distillation to collect 100 g. of a fraction which was distilled under a vacuum of $1 \times 10^{-3}$ mm. Hg and at a temperature of $180°$ to $240°$ C. And then the fraction was treated with thiourea as described in Example 12 to obtain 5 g. of isoprenyl alcohol having 9 isoprene units.

What is claimed is:

1. A process for the manufacture of coenzymes $Q_9$ $Q_{11}$ and $Q_{12}$ comprising: saponifying with an alkali the fatty matter extracted from silkworm feces or mulberry leaves with an organic solvent, separating the unsaponified matter from the saponified matter by adding hexane to the saponification mixture and removing the unsaponified material as a hexane solution, subjecting the unsaponified matter to a fractional crystallization by dissolving in a solvent selected from the group consisting of hexane and acetone and cooling to $0°$ to $-20°$ C. to divide an uncrystallized portion containing isoprenyl alcohols having 9, 11 and 12 isoprene units and a crystallized portion containing sterol, carotene and saturated alcohols, subjecting the uncrystallized portion to a molecular distillation to obtain a fraction which is distilled out at a temperature of $180°$ to $240°$ C. to obtain isoprenyl alcohols 9, 11 and 12 isoprene units, condensing the obtained isoprenyl alcohols with 2,3-dimethoxy-5-methyl-1,4-hydroquinone or its 4-acyl derivatives with use of catalyst and solvent and oxidizing the obtained condensate to obtain coenzymes $Q_9$, $Q_{11}$ and $Q_{12}$.

2. A process as claimed in claim 1 wherein the organic solvent which is able to extract a fatty matter from the raw material is acetone, chloroform, ether and hexane.

3. A process as claimed in claim 1 wherein the unsaponified matter is purified by a molecular distillation and then is treated with thiourea to obtain an adduct compound of thiourea-isoprenyl alcohol having 9 isoprene units and the compound is subjected to an adsorption chromatography to isolate isoprenyl alcohol having 9 isoprene units and the compound is subjected to an adsorption chromatography to isolate isoprenyl alcohol having 9 isoprene units.

4. A process for the manufacture of coenzyme $Q_{10}$ wherein solanesol which is obtained as in claim 1 is brominated with a brominating agent and the obtained bromide is condensed with aceto acetic acid and the obtained condensate is subjected to a saponification and also decarboxylation to obtain a ketone of 48 carbon atoms and the obtained condensate is partially hydrogenated to obtain isodecaprenyl alcohol and then the isodecaprenyl alcohol is condensed with 2,3 - dimethoxy-5-methyl-1,4-hydroquinone or its 4-acyl derivative with use of catalyst and solvent and the obtained condensate is oxidized.

5. A process for the manufacture of coenzyme $Q_{10}$ wherein solanesol which is obtained as in claim 1 is brominated with a brominating agent and the obtained bromide is condensed with aceto acetic acid and the obtained condensate is subjected to a saponification and also decarboxylation to obtain a ketone of 48 carbon atoms and the obtained condensate is partially hydrogenated to obtain isodecaprenyl alcohol and then the isodecaprenyl alcohol is isomerized to obtain decaprenyl alcohol and the decaprenyl alcohol condensed with 2,3-dimethoxy-5-methyl-1,4-hydroquinone or its 4-acyl derivative with use of catalyst and solvent and the obtained condensate is oxidized.

6. Coenzyme $Q_{11}$ of the formula

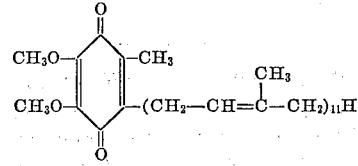

7. Coenzyme $Q_{12}$ of the formula

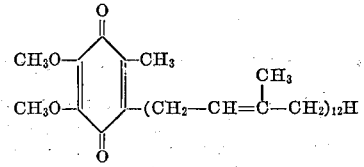

References Cited

UNITED STATES PATENTS 3,118,914   1/1964   Gloor et al. _____ 260—396

LORRAINE A. WEINBERGER, Primary Examiner

L. A. THAXTON, Assistant Examiner

U.S. Cl. X.R.

260—632